(12) United States Patent
Mojaver

(10) Patent No.: US 10,404,910 B2
(45) Date of Patent: Sep. 3, 2019

(54) SUPER RESOLUTION IMAGING AND TRACKING SYSTEM

(71) Applicant: Epilog Imaging Systems, San Diego, CA (US)

(72) Inventor: Michael Mojaver, Poway, CA (US)

(73) Assignee: Epilog Imaging Systems, San Diego, CA (US)

( * ) Notice: Subject to any disclaimer, the term of this patent is extended or adjusted under 35 U.S.C. 154(b) by 314 days.

(21) Appl. No.: 14/578,098

(22) Filed: Dec. 19, 2014

(65) Prior Publication Data

US 2015/0103166 A1    Apr. 16, 2015

Related U.S. Application Data

(63) Continuation of application No. 13/236,023, filed on Sep. 19, 2011, now abandoned.

(51) Int. Cl.
*H04N 5/232* (2006.01)
*H04N 5/225* (2006.01)
*H04N 7/18* (2006.01)
*G02B 26/10* (2006.01)

(52) U.S. Cl.
CPC ......... *H04N 5/23232* (2013.01); *G02B 26/10* (2013.01); *H04N 5/2258* (2013.01); *H04N 5/2259* (2013.01); *H04N 7/183* (2013.01); *H04N 7/18* (2013.01)

(58) Field of Classification Search
CPC ............... H04N 5/2258; H04N 5/2259; H04N 5/23232; H04N 7/18; H04N 7/183

USPC ......................................................... 348/143
See application file for complete search history.

(56) References Cited

U.S. PATENT DOCUMENTS

| | | | |
|---|---|---|---|
| 5,923,466 A | 7/1999 | Krause et al. | |
| H1914 H | 11/2000 | Watkins | |
| 7,294,815 B2 | 11/2007 | Haven | |
| 7,478,754 B2 | 1/2009 | Guerevich et al. | |
| 2004/0201704 A1* | 10/2004 | Tseng | G02B 27/646 348/208.1 |
| 2005/0220353 A1* | 10/2005 | Karczewicz | G06T 3/4007 382/238 |
| 2006/0261167 A1 | 11/2006 | Ray et al. | |
| 2008/0174670 A1* | 7/2008 | Olsen | H01L 27/14645 348/222.1 |
| 2009/0180020 A1 | 7/2009 | Nayar et al. | |
| 2010/0102239 A1* | 4/2010 | Hahn | G06T 5/50 250/363.05 |
| 2010/0214468 A1* | 8/2010 | Caron | G02B 3/10 348/345 |

(Continued)

*Primary Examiner* — Md N Haque
(74) *Attorney, Agent, or Firm* — Nelson Mullins Riley & Scarborough LLP; Thomas J. Engellenner; Reza M. Mollaaghababa

(57) ABSTRACT

In one aspect, the present invention provides an imaging system, which includes an optical system for collecting light from a field of view and directing it to an image plane. One or more image detecting elements are disposed on a movable platform coupled to the image plane. The image detecting elements detect the collected light and generate image data corresponding to the field of view. A processor in communication with the image detecting elements receives the image data. The processor is configured to effect movement of the platform to move the one or more image detecting elements within the image plane to gather the image data.

11 Claims, 14 Drawing Sheets

(56) References Cited

U.S. PATENT DOCUMENTS

2010/0283842 A1* 11/2010 Guissin ................ G02B 13/06
  348/68
2011/0032325 A1   2/2011 Harris

* cited by examiner

SUPER RESOLUTION IMAGING AND TRACKING SYSTEM

CROSS-REFERENCE TO RELATED APPLICATIONS

The present application is a continuation of U.S. patent application Ser. No. 13/236,023, filed Sep. 19, 2011, which is herein incorporated by reference in its entirety.

FIELD

The present invention is generally directed to imaging systems and methods, and more particularly, to such systems and, methods that allow obtaining different portions of a field of view at varying resolutions.

BACKGROUND

Imaging systems are employed in a variety of applications. For example, in surveillance applications, imaging systems can provide still or video images of a field of view, and in some cases, such systems can detect changes in the field of view, e.g., movement of a vehicle, a person, or fire and smoke. Some surveillance imaging systems provide a wide-angle image of a field of view as well as a narrow-angle image of a portion of that field. For example, a fixed-position camera having a wide-angle lens can be employed to acquire the wide-angle image and a pan-tilt-zoom (PTZ) camera can be directed to acquire the narrow-angle image. In some cases, the PTZ camera can be directed to track an object that moves within the field of view, e.g., based on positioning information provided by the wide-angle image.

There is still a need for improved imaging systems. For example, in surveillance applications, it is desirable to obtain images of tracked objects of interest at significantly higher resolution than is possible using conventional sensors and imaging systems currently available.

SUMMARY

In one aspect, the present invention provides an imaging system including an optical system for collecting light from a field of view and directing it to an image plane. The system also includes one or more image detecting elements disposed on a movable platform disposed in the image plane. The one or more image detecting elements can detect at least a portion of the collected light to generate image data corresponding to the field of view. The system further includes a processor in communication with the plurality of image detecting elements to receive the image data. The processor can be configured to create a first image (e.g., a global image) from the image date representing at least a portion of the field of view. The processor can be further configured to create a second image (e.g., a local image) from the image data representing at least a portion of the field of view depicted in the first image. The processor can be configured to acquire the image data while the movable platform is stationary, in motion, or through various combinations of starting and stopping motion.

While in some embodiments, one or more image detecting elements are fixedly attached to a platform and the platform is movable, in other embodiments, one or more of imaging detecting elements can be removably attached to a platform (i.e., they can be capable of moving relative to the platform), where the platform can be stationary or movable (e.g., rotatable).

In some embodiments, the processor can be further configured to create the first image from the image data at a first resolution and create the second image from the image data at a second resolution (and/or resolution per unit area) that is greater than the first resolution. In addition, the first and second images can represent overlapping portions of the field of view. In some cases, the second image represents a portion of the field of view that is contained within the portion of the field of view represented in the first image. In some embodiments, the first image can have a resolution per unit area that is less than about 50 megapixels per square inch, while the second image, which can be created in some embodiments from a larger fraction of the image data, can have a resolution per unit area that is equal to or greater than about 50 to about 100 megapixels per square inch. In some embodiments, the second image can exhibit an effective resolution on the order of gigapixels or more. In other words, the resolution of the second image can be comparable to the resolution of a similar-sized image obtained by a hypothetical stationary detector having $10^9$ or more image detecting pixels.

In certain implementations, the processor analyzes the first image to identify one or more objects of interest in the field of view and effects acquisition of the image data such that the second image corresponds to a portion of the field of view containing the one or more objects of interest.

The image detecting elements can be disposed on the movable platform in a variety of configurations. In some implementations, the image detecting elements are distributed non-uniformly over the platform. In some cases, the non-uniform distribution of image detecting elements can include a plurality of image detecting clusters, or tiles, each of which has a density of image detecting elements greater than the average density of image detecting elements over the platform. An average density can be determined as the ratio of the total number of image detecting elements relative to an area of the platform on which the image detecting elements are disposed. An exemplary range for the average density of image detecting elements over the platform is from about 2 to about 20 image detecting elements per square inch of the platform. An exemplary range for the average density of image detecting elements within a cluster is about 1 to about 10 image detecting elements per square inch of the platform. In addition, in certain embodiments the resolution per unit area of each cluster can range from about 1 megapixel per square inch to about 10 megapixels per square inch.

In many embodiments, each plurality, or cluster, of image detecting elements is separated from other clusters by an area in which no image detecting elements are present (herein referred to as a "detector-free zone"). In order to image these areas, the processor can be configured to instruct the controller to cause a rotation of the platform sufficient to allow at least a portion of the image detecting elements to obtain image data corresponding to the field of view missing from the image data due to the detector-free zones.

In some embodiments, the movable platform is configured to rotate about an axis, e.g., the optical axis of the imaging system, and the image data is acquired while the platform is rotating. In some embodiments, one fraction of such image data can be utilized to generate the first image and another fraction of the image data, which can have overlap with the first fraction, can be utilized to generate the second image.

The processor can be configured to construct the first and second images using a variety of image data sampling techniques. For example, the processor can be configured to operate on image data acquired by a plurality of image detecting elements in m number of image detecting clusters to generate the first image, while operating on image data acquired by a plurality of image detecting elements in n number of clusters to generate the second image, where n is greater than m.

In other embodiments, the image data acquired by the image detecting elements includes a plurality of image pixels and the processor is configured to operate on a scaled version of the image data comprising a subset, or fraction, of those pixels to generate the first image. Many different fractions can be utilized depending on performance requirements. In some embodiments, the fraction of pixels can be my of about ½, about ¼, about ⅕, about ⅒, about ¹⁄₁₀₀, about ¹⁄₂₀₀, about ¹⁄₁₀₀₀, or about ¹⁄₁₀,₀₀₀ of the image pixels.

In some embodiments, the imaging system of the present invention can include an actuator in communication, with the movable platform and the processor such that the actuator can effect movement of the platform in response to instructions from the processor. In some implementations, the movable platform can be a rotatable platform and the actuator can be configured to effect rotation of the platform. In other embodiments, the movable platform can be a translating platform that translates in two dimensions across the image plane. In such a case, the actuator can be configured to effect the translation of the platform.

In another aspect of the invention, an imaging system is provided that includes an optical system for collecting light from a field of view. The system further includes a rotatable platform on which a plurality of image detecting elements are disposed and configured to receive at least a portion of the collected light to generate image data corresponding to at least a portion of the field of view. The system also includes a controller for controlling rotation of the platform and a processor in communication with the controller and the image detecting elements. The processor is configured to receive image data acquired by said image detecting elements and to analyze the image data to identity one or more objects of interest. The processor is adapted to instruct the controller to cause rotation of the platform and instruct at least a subset of the image detecting elements to acquire image data corresponding to a portion of the field of view in which the one or more objects of interest are disposed while the platform is rotating.

The image detecting elements disposed on the rotatable platform can produce a plurality of image pixels in response to the detection of light collected from the field of view. The processor can be configured to utilize a fraction of the image pixels in the image data to create a first image at a resolution (and/or resolution per unit area) less than a resolution (and/or a resolution per unit area) attainable by using all of the pixels in the image data. That fraction, can be, as mentioned above, any of about ¼, about ⅕, about ⅒, about ¹⁄₁₀₀, about ¹⁄₂₀₀, about ¹⁄₁₀₀₀, or about ¹⁄₁₀,₀₀₀ of the image pixels. Alternatively, the processor can be configured to analyze a scaled version of the image data to identify the one or more objects of interest. In some embodiments, the scaled version of the image data may be a subset of the image data. In certain implementations, the processor is configured to select the subset of the image data so as to allow identifying one or more objects of interest in the entire field of view represented by the image data (e.g., in the global image), as opposed to, for example, sampling a subset that represents only a certain section of the field of view. In some cases, this can be accomplished by utilizing a fraction of the image data that contains at least some image data from image detecting elements in all image detecting clusters.

In one aspect, the present invention provides an imaging method including the steps of providing a plurality of image detecting elements disposed on a rotatable platform and capturing light emanating from a field of view and directing the captured light to the plurality of image detecting elements at a first orientation of the platform. The method further includes generating first image data using the plurality of image detecting elements and operating on the first image data to generate a first image (e.g., a global image) of the field of view at a first resolution (and/or a first resolution per unit area). The method also includes the steps of rotating the platform and generating second image data using the plurality of image detecting elements, and operating on the second image data to generate a second image (e.g., a local image) of a portion of the field of view depicted in the first image at a second resolution (and/or resolution per unit area) that is greater than the first resolution.

In certain embodiments, the steps of operating on the first and second image data are conducted by a processor. Further, the first image data can include a plurality of image pixels suitable for generating an image of the entire field of view. As mentioned above, in order to generate the first image the processor can operate on a fraction of the image pixels available in the image data. For example, in embodiments in which the image detecting elements are arranged as a plurality of dusters separated from one another by a detector-free zone, the processor can utilize a subset of image data (e.g., a subset of pixels) in each cluster to generate the first image. Alternatively, the processor can utilize the entire image data to form the first image.

In another aspect of the invention, an optical tracking system is provided that includes an optical system for receiving light from a field of view and for directing the received light to a plurality of image detecting elements disposed on a rotatable platform. The image detecting elements can be configured to generate image data in response to detection of the received light. The system further includes a processor in communication with the plurality of image detecting elements that is configured to control the image detecting elements to acquire the image data, receive the image data, and operate on the image data to generate a first image (e.g., a global image) of the field of view at a first resolution. The processor is further configured to analyze the first image to identify at least one object (e.g., a moving object), if any, in the field of view, and to effect a rotation of the rotatable platform and control at least a portion of the image detecting elements to acquire image data corresponding to at least a portion of the field of view in which the moving object is contained. The processor can further be configured to operate on the image data to generate a second image of the object (e.g., the moving object) at a second resolution (and/or resolution per unit area) that is grater than the first resolution (and/or the first resolution per unit area).

In some embodiments, the processor can be further configured to control different portions of the image detecting elements to acquire image data of the moving object as the platform continue to rotate.

In still another aspect of the invention, an imaging system is provided that includes an optical system for collecting light from a field of view, a rotatable platform on which a plurality of image detecting elements are disposed, and a processor in communication with the image detecting elements. The image detecting elements can be configured to receive at least a portion of the collected light from the field of view. The processor can be configured to receive image data acquired by the image detecting elements at a first orientation to create a first image (e.g., a global image) of the field of view. The processor can also be configured to receive image data acquired by the image detecting elements at a second orientation to create a second image (e.g., a local image) of the field of view.

As mentioned above, the second image can have a resolution (and/or resolution per unit area) higher than that of the first image. In addition, the system can include a controller in communication with the processor that can receive instructions from the processor and control rotation of the platform. Further, the processor can select the second orientation such that image data collected at the second orientation includes any portions of the field of view from which image data was not obtained at the first orientation.

In yet another aspect of the invention, an imaging system is provided that includes an optical system for collecting light from a field of view, a plurality of image detecting elements optically coupled to the optical system and configured to detect at least a portion of the collected light to generate a plurality of image pixels corresponding to the field of view, and a processor in communication with the image detecting elements and configured to control said elements to acquire the image pixels substantially concurrently. The processor can be configured to operate on a first fraction of the image pixels to generate a first image (e.g., a global image) of the field of view at a first resolution and to operate on a second fraction of the image pixels to generate a second image (e.g., a local image) of the field of view at a second resolution, where the first and second images are at least partially overlapping and the second resolution (and/or resolution per unit area) is greater than the first resolution (and/or the first resolution per unit area).

In still a further aspect of the invention, an optical imaging system is provided including an optical system for collecting light from a field of view, a rotatable platform, and a plurality of image detecting elements disposed on the rotatable platform so as to receive the collected light. The image detecting elements generate image data in response to detection of the collected light. The system further includes a processor in communication with the platform and the image detecting elements, the processor being configured to (i) instruct at least a portion of the image detecting elements to acquire image data of the field of view, (ii) operate on a scaled version of the image data to generate a first image (e.g., a global image) of the field of view at a first resolution, (iii) analyze the first image to identify one or more objects of interest in the field of view, (iv) effect rotation of the platform and instruct at least a portion of the image detecting elements to acquire image date of the object while the platform is rotating, and (v) analyze the image data to generate a second image (e.g., a local image) of the object at a resolution (and/or resolution per unit area) greater than the first resolution (and/or the first resolution per unit area).

The aspects and elements of the present invention described above can be combined in various manners such that elements described with respect to one aspect of the invention could also be included with any other aspect of the invention. As such, this summary does not limit the present invention, but instead describes some exemplary features of the invention.

BRIEF DESCRIPTION OF THE DRAWINGS

The invention will be more fully understood from the following detailed description taken in conjunction with the accompanying drawings, in which like numerals are used to refer to like elements.

DETAILED DESCRIPTION

Figure 1:
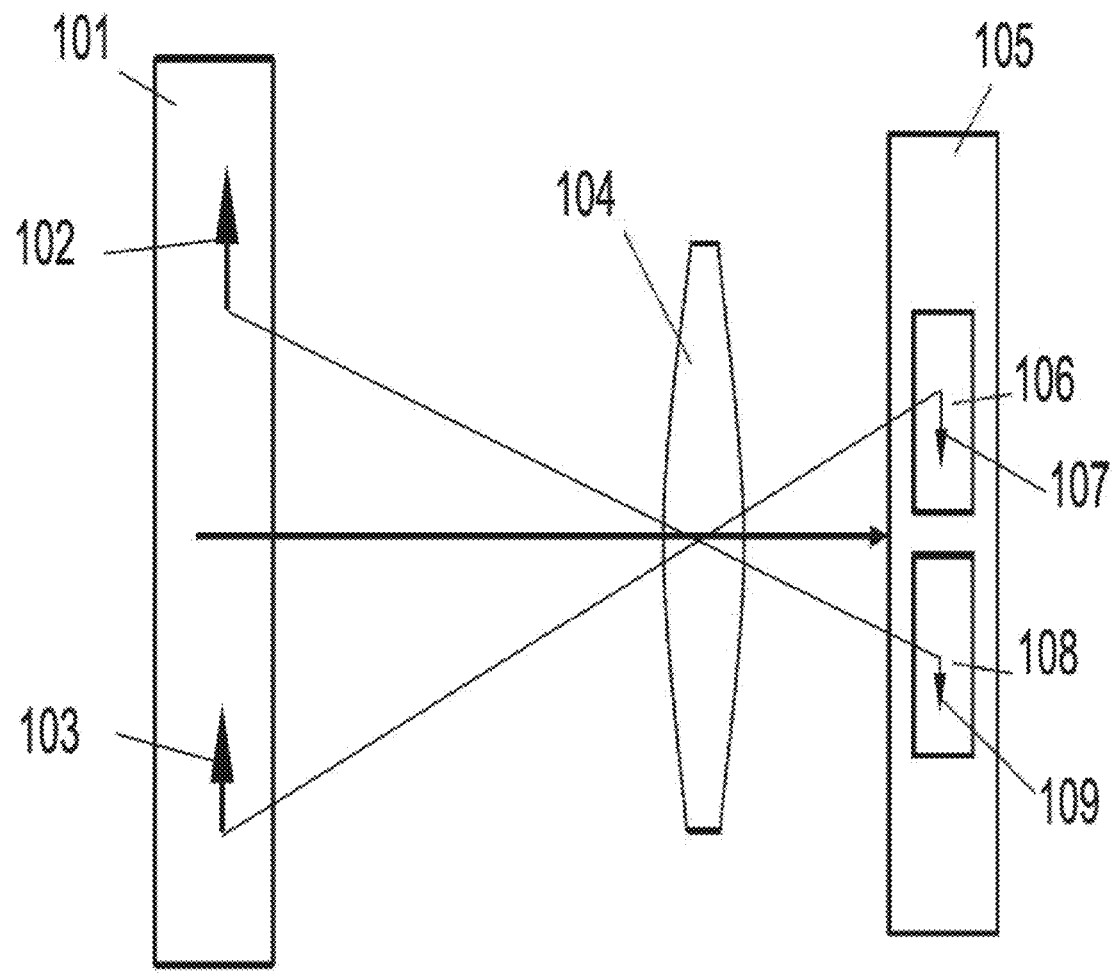
FIG. 1 is a schematic representation of an exemplary embodiment of an imaging system according to the teachings of the present invention.

Certain exemplary embodiments will now be described to provide an overall understanding of the principles of the methods and systems disclosed herein. One or more examples of these embodiments are illustrated in the accompanying drawings. The methods and systems specifically described herein and illustrated in the accompanying drawings are non-limiting exemplary embodiments and that the scope of the present invention is defined by the claims. The features illustrated or described in connection with one exemplary embodiment may be combined with the features of other embodiments. Such modifications and variations are intended to be included within the scope of the present invention.

The present invention generally provides systems and methods for obtaining still or video images of a field of view, and displaying high resolution images of at least a portion of the field of view while presenting information regarding the context of that portion within the field of view. In many embodiments, the systems and methods of the present invention advantageously allow simultaneous and rapid generation of high resolution images corresponding to different portions of the field of view. Such rapid generation of the high resolution images can be suitable for a variety of applications, and in particular, for object tracking applications in which high resolution images of one or more objects are generated as those object(s) move within the field of view. The term "resolution" is used herein consistent with its common usage in the art, and particularly in the field of digital imaging, to refer to the number of fight sensitive pixels in an image. As an example, 35 mm film, which is historically used in photography, produces a resolution of approximately 20 megapixels per frame when coupled with the high-quality diffraction-limited optics. The term "resolution per unit area" is used herein to refer to the number of light sensitive pixel in a unit area of an image, e.g., the number of pixels per square inch of the image.

In many embodiments, a system according to the teachings of the invention can operate by directing light from a field of view onto an image plane containing one or more image detectors, each of which acquires image data corresponding to a portion of the field of view. In some embodiments, a wide-angle image of the field of view as well as one or more enhanced still or video images of one or more portions of the field of view can be created. For example, and as discussed in more detail below, in some embodiments, one or more image detectors can be fixedly or movably coupled to the image plane and can generate image data for the full, or global, field of view, e.g., in a time shared manner. The image of the full field of view can be analyzed (e.g., to detect one or more objects of interest) to generate control signals to opportunistically position the movable detector(s) to scan across one or more selected portions of the image plane to generate local still or video images of those portions of the field of view at a high resolution.

The term "image plane" is known in the art. To the extent that any further explanation may be needed, the term "image plane" can refer to a plane on which the image of at least a portion of the field of view is formed, e.g., the surface of a detector. While in many embodiments the image plane is flat, in other embodiments it can be curved. The term "global image," as used herein, refers to an image of at least a portion of a field of view, and in many cases, an entire field of view of interest. The term "local image," as used herein, refers to a portion (e.g., a subset) of the field of view depicted in the global image. In many cases, the global image can be characterized as a wide-angle image and the local image can be characterized as a narrow-angle image.

Figure 2:
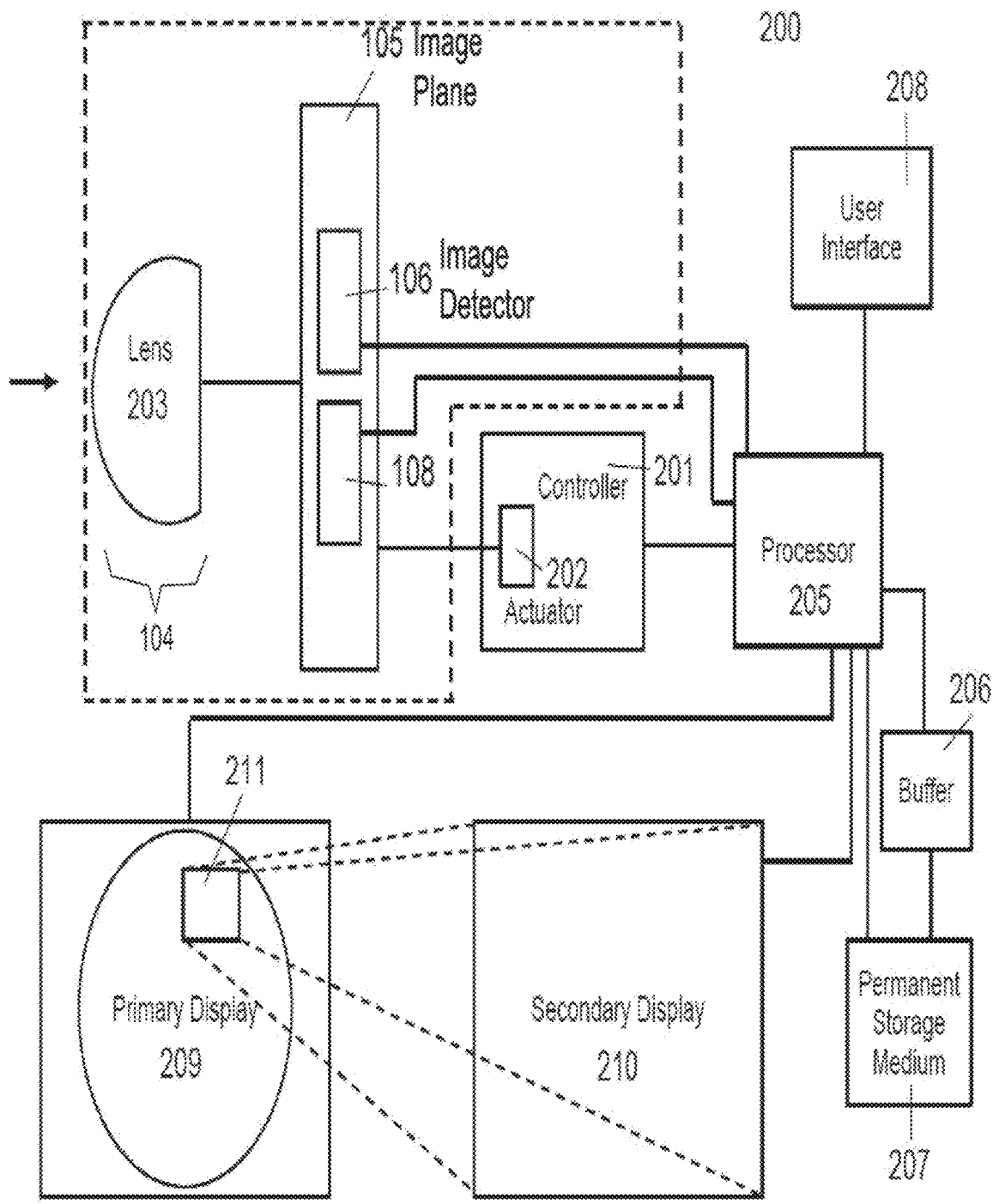
FIG. 2 is a second diagram of an exemplary embodiment of an imaging system according to the teachings of the present invention.

With reference to FIGS. 1 and 2, an exemplary imaging system 100 according to an embodiment of the invention includes an optical system 104 for collecting light from a field of view 101. In the implementation illustrated in FIG. 1, the optical system 104 directs the collected light onto an image plane 105. The image plane 105 contains one or more image detectors 106, 108. FIG. 1 shows two image detectors 106 and 108, but any number may be used according to various constraints such as size, cost, power consumption, desired resolution, desired imaging speed, etc. In some embodiments, each image detector 106, 108 can include a plurality of image detecting elements, e.g., an array of Charge Coupled Device (CCD) elements.

By way of example, an object 102 located in the field of view can be imaged onto image detector 108 and another object 103 located in the field of view can be imaged onto image detector 106, both through the optical system 104.

The image detectors are optically coupled to the field of view 101 and can detect at least a portion of the light that is directed to the image plane to acquire image data of the field of view, or at least a portion thereof. The image detectors are optically and movably coupled to the field of view 101. This can be accomplished, for example, by mounting the image detectors to a movable platform coupled to the image plane 105, e.g., disposed in or in proximity to the image plane. The image detectors can move so as to detect light at a plurality of locations so as to acquire linage data of the field of view, or at least a portion thereof. As discussed in more detail below, in many embodiments, the image data acquired (e.g., by the image detectors 106 and 108) can be processed to construct a first, global image and a second, local image based on the image data acquired by several image detectors.

Though not illustrated in this embodiment, the exemplary system 100 can further include additional detectors disposed in the image plane to which light emanating from the field of view can be directed. By way of example, such configurations allow for multiple higher resolution images to be created simultaneously from different portions of the field of view.

With reference to FIG. 2, in one implementation of the imaging system 100, an imaging system 200 can include a controller 201 that is coupled to a movable platform disposed in the image plane 105, which is optically and movably coupled to the optical system 104 (depicted here as a lens 203). As discussed in more detail below, the controller is configured to effect the movement, (e.g., rotation) of the image detectors, e.g., within the image plane, to sample light at different locations of the image plane so as to acquire image data.

The controller 201 can include an actuator 202 that converts electrical signals generated by the controller into mechanical movement of the movable platform and the image detectors.

The exemplary imaging system 200 can also include a processor 205 that is electrically coupled to the image detectors 106 and 108 and the controller 201. The processor 205 is configured to collect image data acquired by the image detectors, process the collected image data to construct resulting images, and control the movement of the movable platform disposed within the image plane 105 via the controller 201. For example, and as discussed in more detail below, the processor can form an image of the field of view based on the image data acquired by the image detectors and can analyze that image to identify one or more objects of interest, if any, in the field of view. The processor can then generate control signals indicative of the coordinates of that object within the field of view and can communicate control signals indicative of those coordinates to the controller 201.

By way of example, in use, the processor 205 can be configured to periodically effect a scan of the field of view using image detectors 106, 108. This can be accomplished, for example, by moving the image detectors 106, 108 across the image plane periodically (e.g., once every thirtieth of a second). For example, in some embodiments, the platform on which the image detectors are disposed can be rotated to scan the field of view. The processor 205 can then select a portion of the field of view captured by the image data acquired by the image detectors 106, 108. The processor 205 can then instruct the controller 201 to move (e.g., scan) the image detectors 106, 108 over an area of the image plane 105 corresponding to the selected portion of the field of view so as to acquire image data at a higher resolution (and/or resolution per unit area). The processor 205 can then collect image data from the image detectors 106, 108 as it scans the selected portion of the field of view. Finally, the processor 205 can use the collected image data to construct a local image of the selected portion of the field of view at a high resolution as well as, with consecutive periodic scans, construct and update a global image of the field of view. The processor can construct the images such that the local image has a resolution (and/or resolution per unit area) that is higher than the resolution (and/or the resolution per unit area) of the global image. For example, the local image of the selected portion generated based on the image data acquired by the image detectors can exhibit a resolution that is at least about 2 times, or at least about 10 times, or at least about 1000 times, greater than the corresponding resolution of the global image.

The exemplary system 200 can further include a buffer 206 that can be utilized, e.g., for temporary storage of the image data acquired by the image detectors. The processor can communicate with the buffer to store image data therein or to retrieve image data therefrom. In some cases, each of the image detectors includes an integrated buffer for temporary storage of the image data acquired by that image detector.

Processor 205 can also be connected to a primary display 209 and a secondary display 210 to send data corresponding to the global image and local images, respectively, thereto so that those images can be displayed. In some cases, the processor can effect the display of a graphical element, such as a call-out box, in the primary display that highlights the portion of the field of view reproduced at a higher resolution and displayed in the secondary display 210. The term "display," as used herein, can refer to a device, such as a computer monitor or a television monitor, that allows visual presentation of data, e.g., images, and it can also refer to at least a portion of a screen provided by such a device for viewing images. For example, a display can refer to a computer monitor or a window provided on a computer screen.

While in many embodiments the global image and the local, higher-resolution, image can be presented in separate physical displays, in some embodiments, the higher-resolution image can be presented as an overlay on a respective portion of the global image.

Figure 5A:
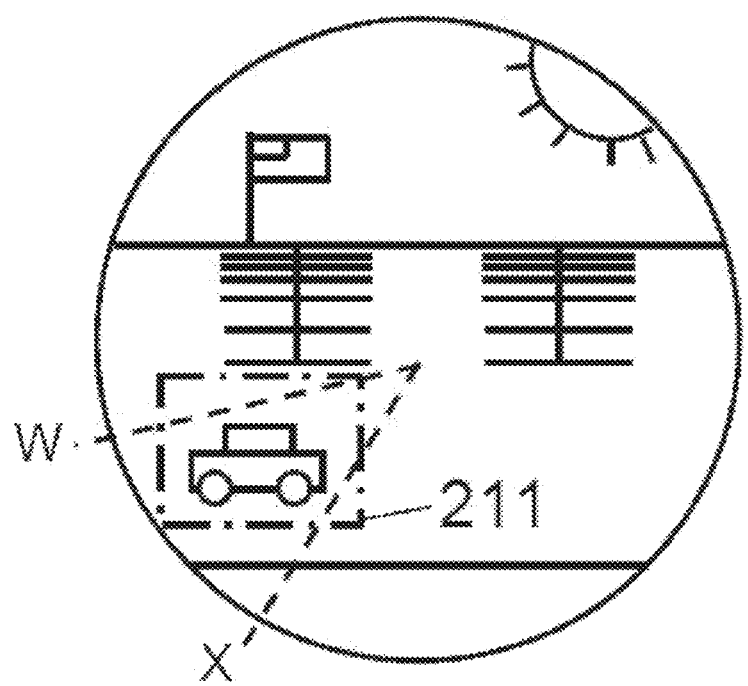
FIG. 5A is a schematic illustration of an exemplary image plane showing an object of interest that can be imaged using the teachings of the present invention.
Figure 5B:
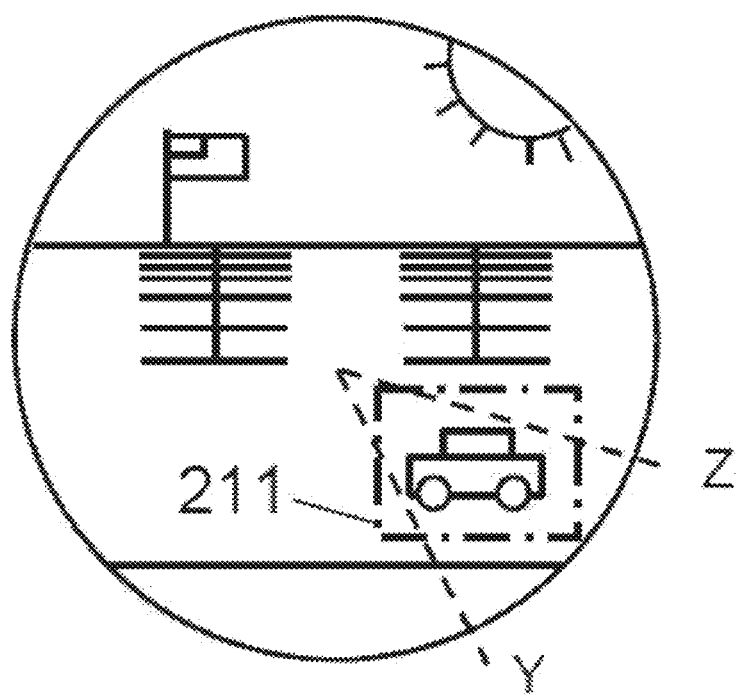
FIG. 5B is a schematic illustration of an exemplary image plane showing movement of the object of interest that can be tracked using the teachings of the present invention.

As shown schematically in FIGS. 2, 5A, and 5B, a graphical object, such as a call-box 211, can delineate the contours of the local image that is generated within the global image. In some embodiments, the global and the local images can be displayed in separate software-generated windows on a single physical display.

Alternatively or additionally, image data, or the resulting local and global images, can be stored on a permanent storage medium 207 for later review. In such a configuration, processor 205 can be in communication with the storage medium 207 to effect the transfer of the image data as well as the constructed images to the storage medium and to effect their retrieval, when desired, for further processing or display. Further, a hybrid system may also be created that both displays and saves image data for later retrieval and review.

With continued reference to FIG. 2, in this exemplary implementation, the imaging system can further include a user interface module 208 connected to processor 205 that allows a user to control the imaging system. User interface module 208 can include any interface hardware known in the art including, for example, a mouse, keyboard, stylus, track pad, or other input devices. In some embodiments, these input devices can be used in combination with the primary and secondary displays 209, 210 to allow a user to select a portion of the field of view displayed in the image plane to be sampled by the movable detector for generating the local image. In such embodiments, the interface module 208 can then communicate the user's selection to the processor 205, which in turn can signal controller 201 to cause the movable platform to move the image detectors 106 or 108 over the designated area of the image plane 105 to capture further image data.

The image detectors can be implemented in several manners. By way of example, FIGS. 3A, 3B, 3C, 3D, and 5 illustrate an exemplary implementation of the movable image detectors 106 and 108, which are disposed on a movable platform and optically coupled to the image plane 105. In these figures, each of the image detectors 106, 108 are embodied as a plurality of image detecting elements 301 that am mounted on a rotatable platform 302. The platform is configured to be rotatable about an axis A (shown in FIG. 4), which can be, for example, parallel to the direction of the central ray of the bundle of light rays directed to the image plane. The image detecting elements 301 can be arranged on the rotatable platform 302 according to a variety of layouts. In this exemplary embodiment, the image detecting elements 301 are disposed on the rotatable platform along a radial direction (R) extending from the center of the rotatable platform 302 to the periphery thereof. In such a configuration, as the platform rotates the line of the image detecting elements sweeps across the image plane 105 with each image detecting element sampling light at different locations. In this manner, the image detecting elements 301 can acquire image data corresponding to at least a portion of the field of view. The controller 201 can control the rotation of the platform so as to allow the image detecting elements 301 to acquire image data corresponding to a selected portion of the field of view (e.g., a portion identified as discussed above).

Figure 3A:
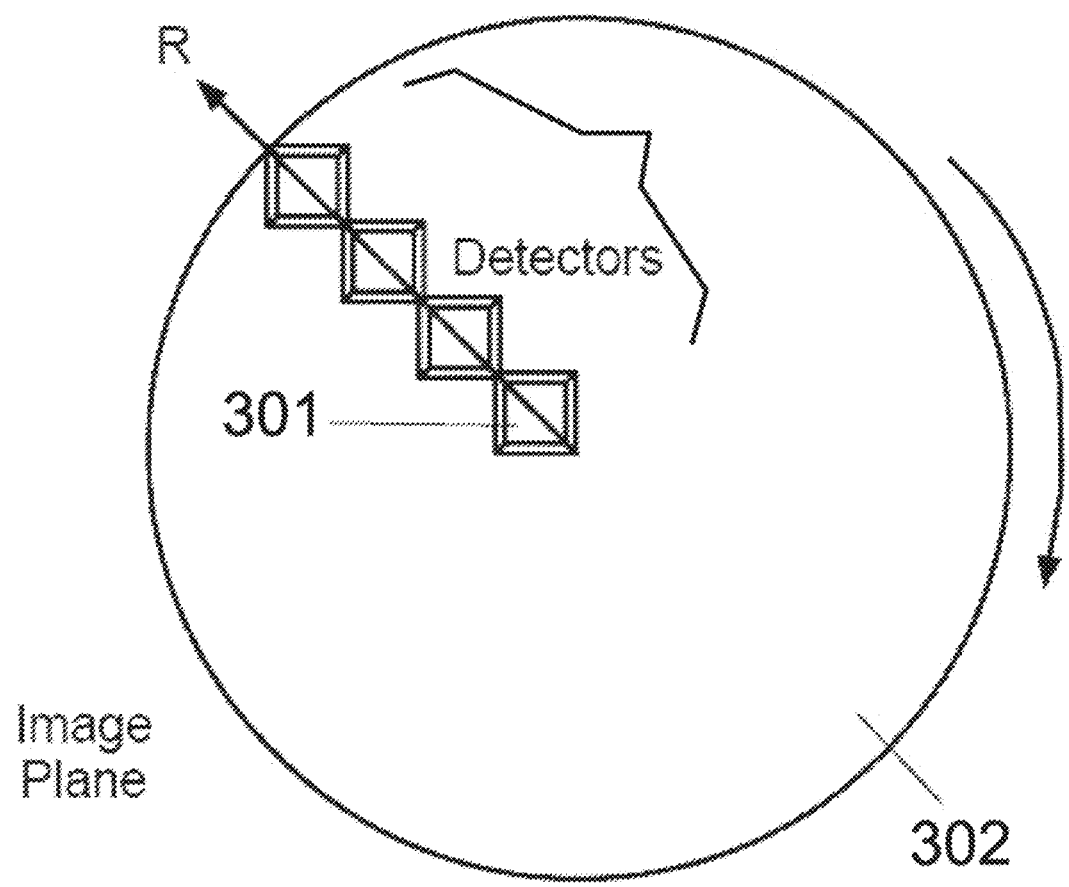
FIG. 3A is a front schematic view of an exemplary embodiment of the image plane containing an image detector configured to rotate an array of image detecting elements.
Figure 3B:
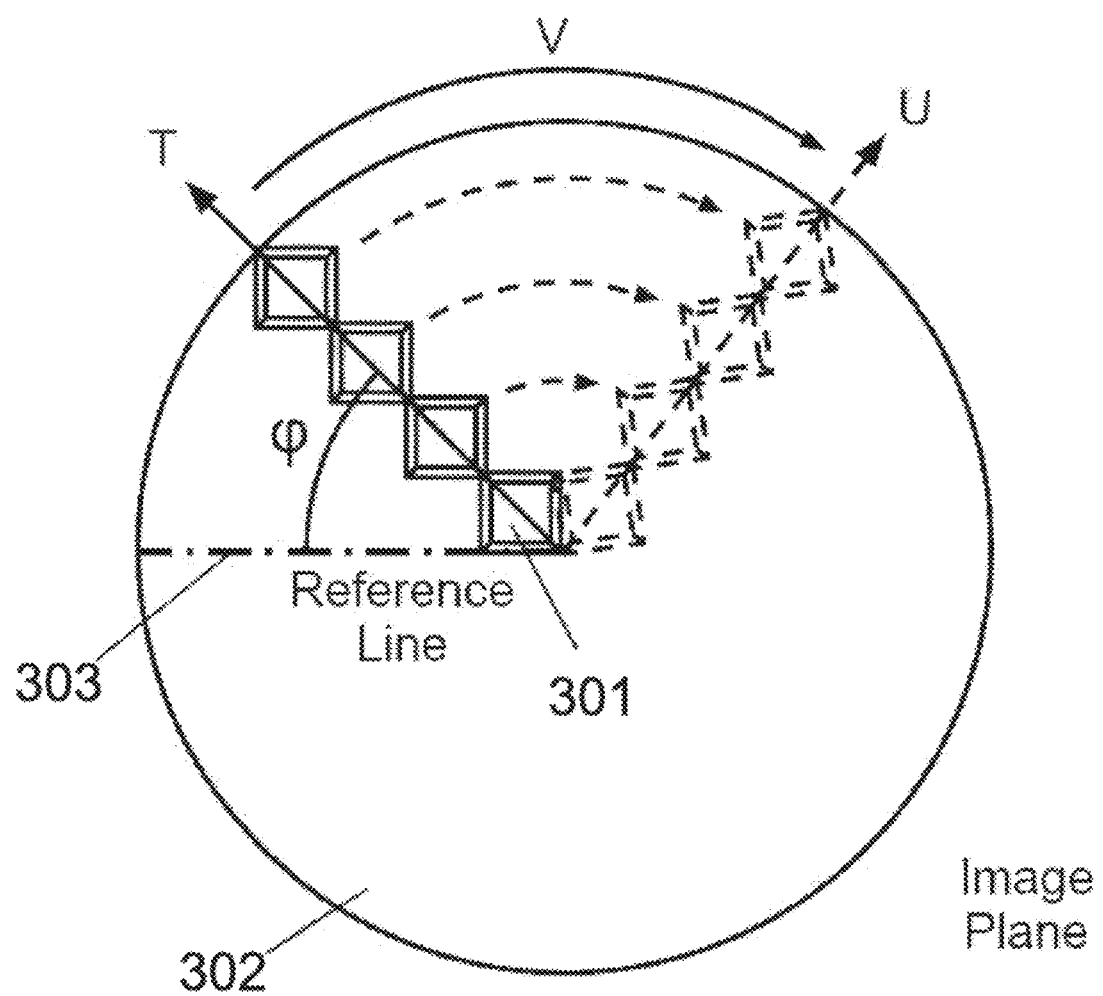
FIG. 3B depicts schematically the rotational movement of the exemplary image detector illustrated in FIG. 3A.
Figure 3C:
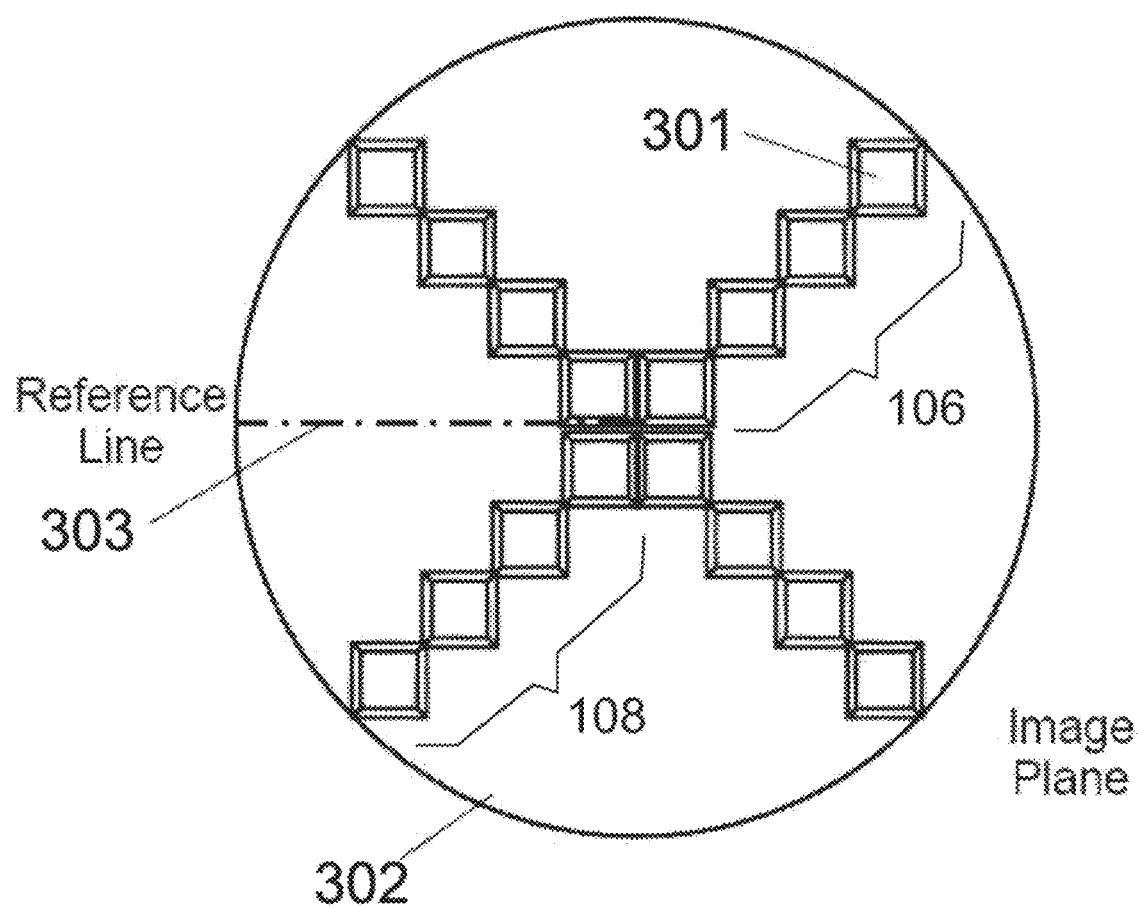
FIG. 3C depicts schematically a front view of an alternative exemplary embodiment of an image detector configured to rotate multiple arrays of image detecting elements to move them in the image plane.

By way of example, and as shown schematically in FIG. 3B, the controller 201 can control the rotation of the platform 302 such that the line of the image detecting elements scans back-and-forth across a slice of the image plane delimited by radial lines T and U and arc V. In this manner, image data corresponding to that slice of the field of view can be obtained. The controller can cause the rotatable platform 302 to move in very small and precise increments—increments even smaller than the unit size of the image detecting elements 301. As a result of these "sub-pixel displacements," image data captured by the image detecting elements 301 will contain overlapping portions of the field of view. The processor 205 can use this overlapping data coverage to create a high resolution image of the selected portion of the field of view. The process of combing multiple displaced lower-resolution images into a higher-resolution image is called "super resolution imaging." Such a technique is described in further detail in "Limits on Super-Resolution and How to Break Them," by Simon Baker and Takeo Kanade, IEEE transaction, on Pattern analysis and Machine Intelligence, Vol. 24., No. 9, September 2002, which is hereby incorporated by reference in its entirety.

Figure 4:
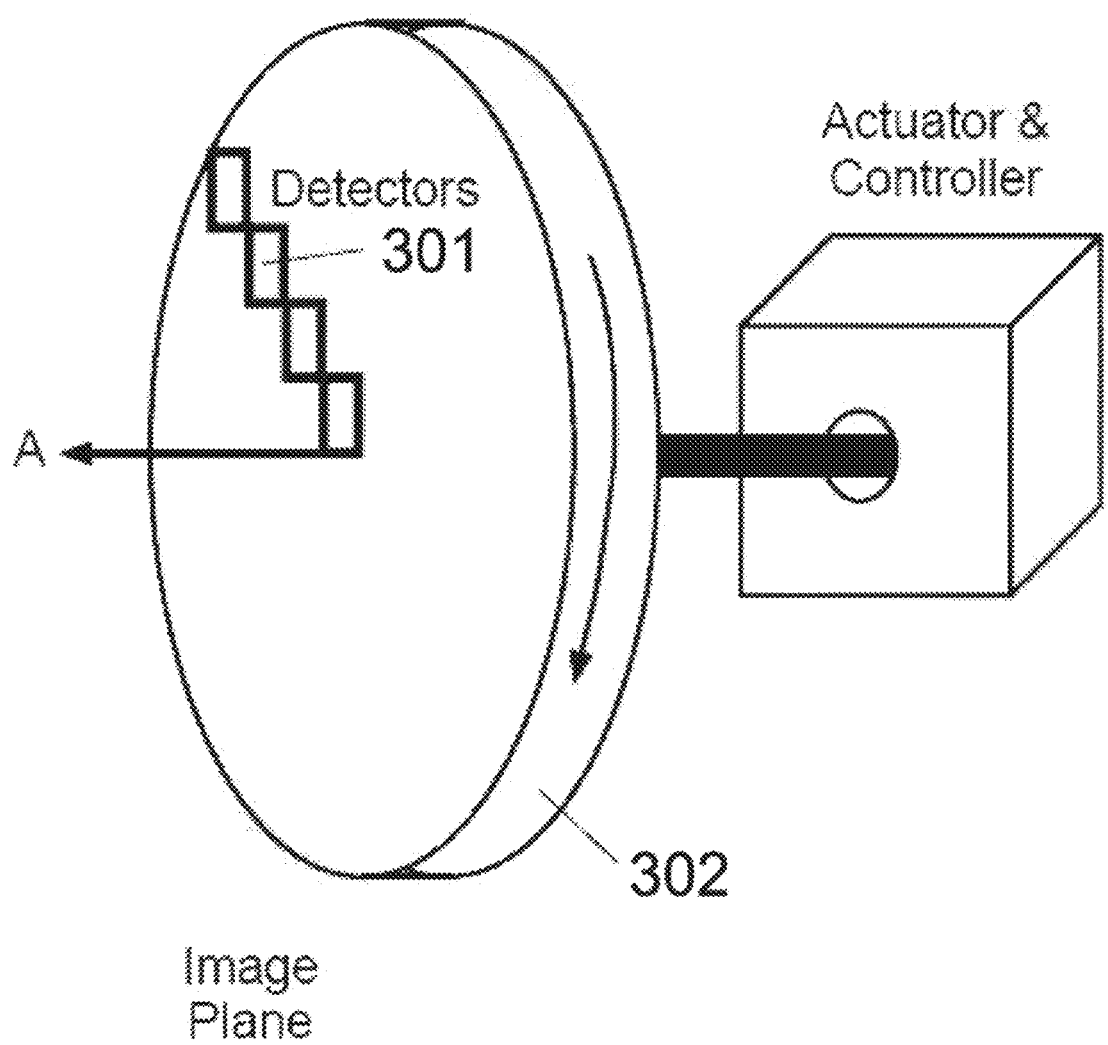
FIG. 4 is a schematic perspective view of the exemplary image detector of FIG. 3A, showing its connection to an exemplary embodiment of an actuator and/or controller.

FIG. 4 illustrates the image detector from a perspective view, showing its attachment to the controller and actuator illustrated in FIG. 2. As illustrated, actuator 202 is configured to rotate the rotatable platform 302 in response to commands from the controller 201 and processor 205. The actuator 202 can be configured to rotate the platform clockwise, counter-clockwise or both, and, in an exemplary embodiment, is capable of quickly and precisely rotating the platform to allow rapid sampling of various areas in the image plane.

The image detector can be configured to communicate with the processor 205, e.g., via the controller 201, to transmit the acquired image data thereto. As the acquired image data is transmitted to the processor 205, the controller 201 can provide the processor with information regarding the correspondence between the transmitted image data and the position of the image detecting elements (e.g., rotational position of those elements) at the time the data was collected. For example, with reference to FIG. 3B, in this implementation, the instantaneous rotational position of the image detector elements can be characterized by an angle ($\varphi$) of the radial line T (along which the image detecting elements 301 are disposed) relative to a radial reference line 303. The processor can employ this information, along with the image data acquired by the image detectors, to construct an image of a portion of the field of view.

In this implementation, the linear density of the image detecting elements (i.e., the number of detecting elements per unit radial length) can be selected based on a variety of factors, such as a desired total resolution for the image plane, the physical constraints of the imaging system, cost, power consumption, etc. For example, in some implementations, 10 mm image detecting elements are disposed along a radial, extent of about 40 mm. Further, the rate of rotation of the platform can be selected based on a variety of factors, e.g., a desired resolution for the image, the data acquisition time associated with the detecting elements, the size of the image detecting elements, etc. For example, for a desired resolution, the platform can be rotated faster as the acquisition time exhibited by the image detecting elements becomes shorter.

The rotation of the image detecting elements advantageously allows obtaining image data at a significantly higher resolution than is currently economically feasible by using a single detecting element or a mosaic or array of fixed-position image detecting elements. In some embodiments, an effective resolution that is greater than the diffraction-limited resolution can be achieved. For example, using the teachings of the invention, an effective resolution that is double or even triple the diffraction limited resolution can be achieved, e.g., an effective resolution per unit area of about 50 to about 100 megapixels per square inch. Accordingly, in some embodiments, systems of the present invention can create images having an effective resolution on the order of gigapixels or more over the entire image plane. The term "effective resolution," as used herein, refers to an equivalent resolution of a single stationary 2-dimensional sensor, e.g., a CCD array. For example, a sensor having 20,000 by 20,000 pixels can have an effective resolution of 400 megapixels.

A variety of different types of image detecting elements can used to gather image data from the image plane. By way of example, such an image detecting element can be, without limitation, a Charge-Coupled Device (CCD) or a Complementary Metal-Oxide Semiconductor (CMOS), Thermal Imaging devices, or other imagers known in the art and suitable for use in the present invention.

The image detecting elements 301 can be disposed on the rotatable platform 302 according to a variety of different layouts depending, e.g., on a particular application, a desired effective resolution, cost, or other constraints. For example, as discussed above, the image detecting elements 301 can be laid out in the radial direction covering the entire radius (or diameter) of the rotatable platform 302. Alternatively, multiple lines of image detecting elements 301 can be placed at various angles (e.g., dividing the rotatable platform into thirds, quarters, fifths, etc.), as shown schematically in FIG. 3C. In still other embodiments, the image detecting elements 301 can be laid out in clusters at various locations on the rotatable platform, as shown schematically in FIG. 3D. A cluster is defined as an area of, for example, the rotatable platform having a higher density of image detecting elements 301 than the average density over the entire rotatable platform. An average density can be determined as the ratio of the total number of image detecting elements related to an area of the platform on which the image detecting elements are disposed.

In addition, certain embodiments may make use of only a single image detecting element 301 mounted on the rotatable platform 302. Such a configuration is illustrated schematically in FIG. 3E. Even with only a single image detecting element 301, for example a single 10 megapixel CCD, an order of magnitude increase in resolution and a doubling of the field of view is possible from the movement of the image detecting element within the image plane.

Figure 3D:
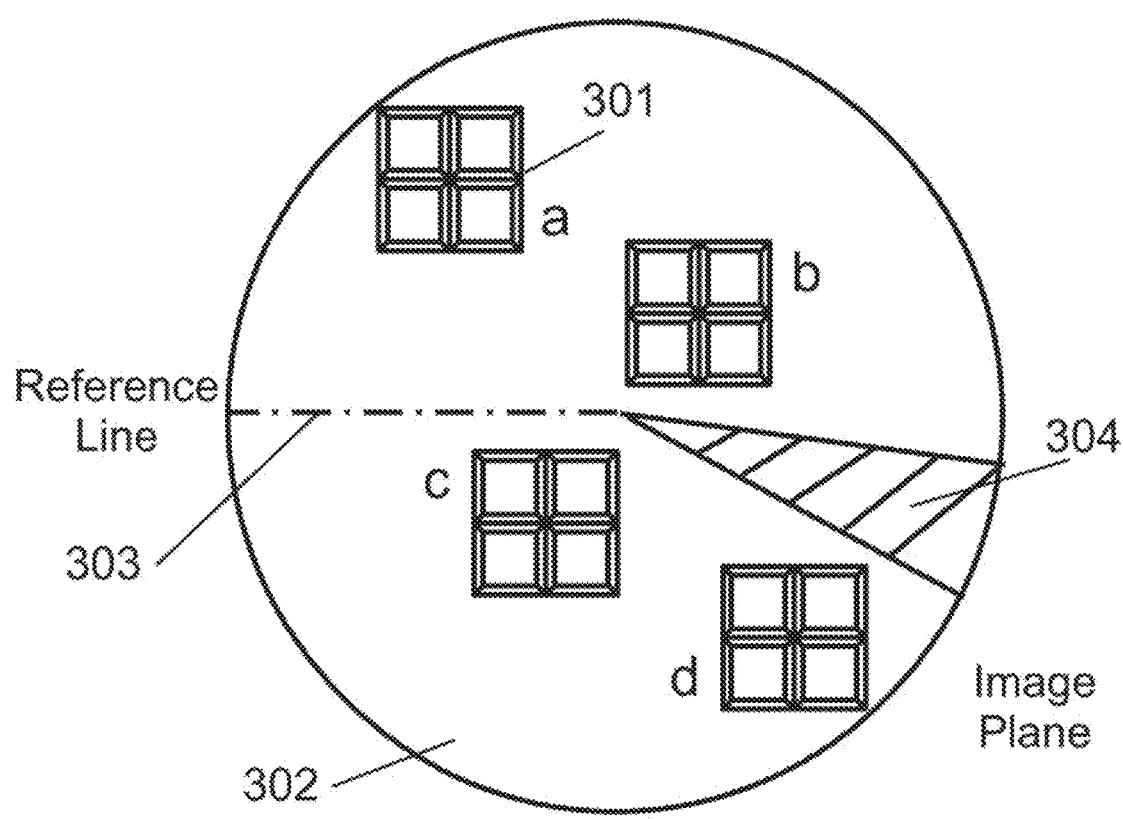
FIG. 3D depicts schematically a front view of yet another alternative exemplary embodiment of an image detector configured to rotate multiple clusters of image detecting elements to move them in the image plane and scan over areas that were previously detector-free zones.
Figure 3E:
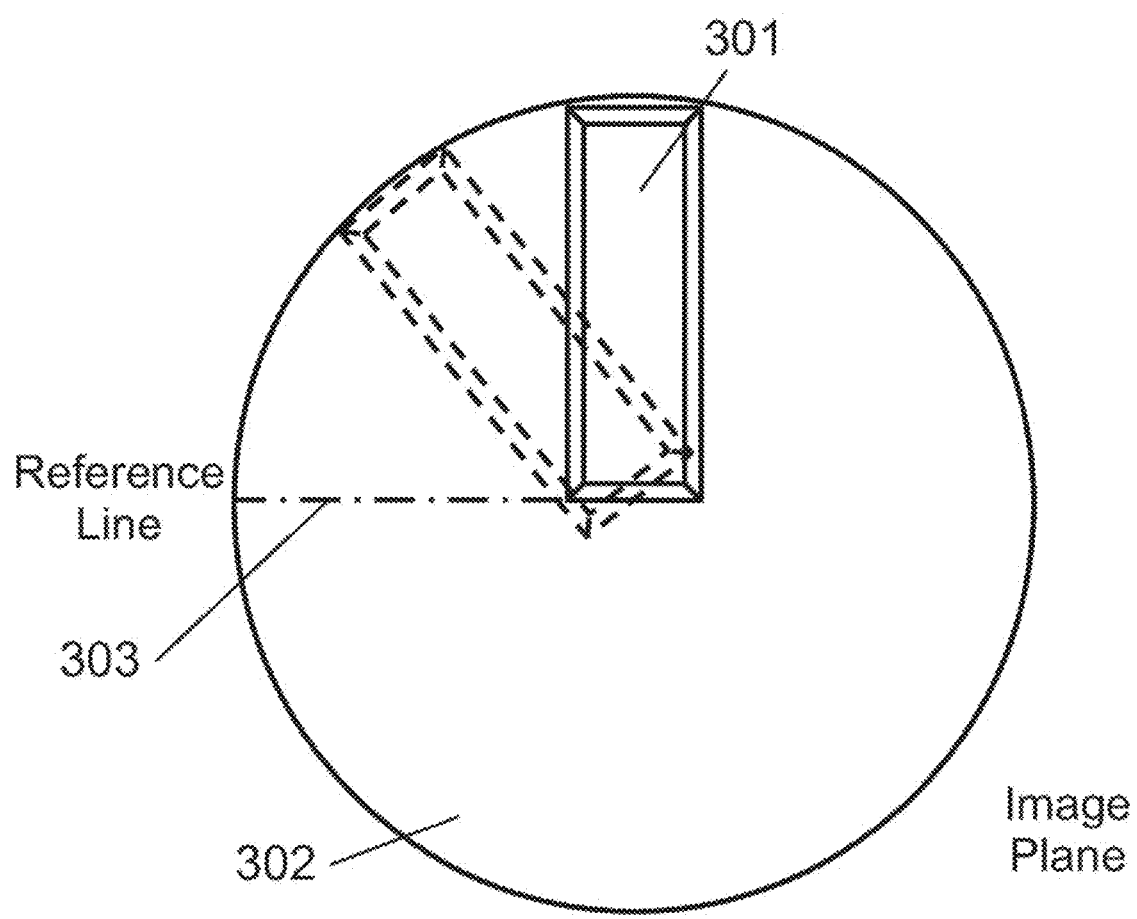
FIG. 3E depicts schematically a front view of another alternative exemplary embodiment of an image detector configured to rotate a single image detecting element within the image plane.

Regardless of the particular layout, individual image detecting elements or clusters of detecting elements are often separated by detector-free zones 304, an example of which is shown in FIG. 3D. Detector-free zones are areas in which no image detecting elements are present. Light incident on these areas is not captured by any image detecting element. As a result, the processor 205 must effect rotation of the rotatable platform 302 to place an image detecting element, or cluster thereof, in a position previously (prior to rotation) occupied by one of the detector-free zones to capture light from a portion of the field of view that would have otherwise fallen on that detector-free zone and not been detected. By rotating the platform and capturing image data at various orientations, a complete image of the field of view can be constructed.

Accordingly, the introduction of additional image detecting elements 301 can reduce the amount of rotation necessary to sample a given portion of the image plane 103 and may also allow for simultaneous sampling of different portions of the image plane (e.g., the upper left and lower right corners of the plane in a configuration having image detector elements spanning the entire diameter of the rotatable platform). The global image, which can depict substantially the entire field of view, can be generated and updated in real time through a suitable combination of image detector placement and rotation dynamics, as discussed herein (e.g., by periodically scanning the entire image plane every thirtieth of a second, as discussed above).

Furthermore, the processor can be configured to use pixels from different image detecting elements, or clusters thereof, to form a global image quickly, albeit at a lower resolution than could be attained if all available pixels were utilized. For example, with reference to FIG. 3D, the processor can utilize a sealed version of the image data, comprising a subset or fraction, of pixels in each of the clusters of image detecting elements 301(a), 301(b), 301(c), and 301(d) to generate a global image, e.g., as the platform moves. Selecting such a subset of all available pixels can allow rapid formation and updating of the global image, albeit at a lower resolution than would be attainable by using all of the pixels. Nonetheless, such a global image can be used to, for example, identify and/or track an object of interest. The movable platform can then be moved over a slice of the field of view containing that object to collect additional image data that can be processed to form a high resolution image of that slice of the field of view and, consequently, of the object of interest. In such embodiments, the subset, or fraction, of available pixels that form the scaled version of the image data can be any fraction of the available pixels including, for example, about ½, about ¼, about ⅕, about ⅒, about 1/100, about 1/200, about 1/1000, or about 1/10,000 of the available pixels.

Still further, in some embodiments, initial image data can be obtained from the image detecting elements when the movable platform is stationary. Such image data can be used, for example, to construct a global image. The platform can then be moved to obtain image data for constructing an image of a portion of the field of view (a local image) at a higher resolution (and/or resolution per unit area) than the global image. In other embodiments, the movable platform can be rotating continuously, and perhaps at varying speeds, as image data is collected to assemble both the global and local images. The image data can also be collected using various combinations of stop-and-go motion in order to scan the image detecting elements over the image plane.

Referring again to FIG. 2, in certain implementations, the image detectors 106, 108 acquire image data by detecting light collected from a field of view via the optical system 104. In some implementations, the optical system 104 can include a wide-angle lens (e.g., lens 203 can be such a wide-angle lens) that can capture light from a scene within a selected field of view. By way of example, the wide-angle lens can be a fisheye lens that can capture light from a 180-degree field of view and direct that light to the image detector. The image detector (which can typically include a plurality of image detecting elements) converts the optical photons incident thereon into electrical signals in a manner known in the art. In some implementations, these electrical signals can be stored under the control of the processor in the buffer 206. The processor can then retrieve the stored image data from the buffer 206 and operate on the image data in a manner known in the art to form an image of the scene. In embodiments in which a wide-angle lens is employed, the processor can optionally correct for geometrical distortions of the image data by employing a number of different algorithms known in the art. By way of example, the teachings of U.S. Pat. No. 6,833,843, entitled "Panoramic Imaging and Display System with Canonical Magnifier," and U.S. Pat. No. 7,750,934 entitled "Immersive Surveillance System Interface," which are hereby incorporated by reference in their entirety, can be employed to correct the geometrical distortions of the wide-angle image plane. In other cases in which a wider-angle lens is not utilized, such corrections may not be needed.

In some implementations, the processor can analyze the image plane to detect one or more objects of interest. Alternatively, the processor can be configured to detect changes in one or more objects of interest from, for example, motion of the object. The processor can utilize well-known image recognition algorithms for detecting the objects. By way of example, when the imaging system is utilized in surveillance applications, the processor can be configured, e.g., via loading appropriate software, to detect human beings, vehicles, or any other object of interest. A variety of image recognition algorithms can be employed. For example, U.S. Pat. No. 6,301,396, entitled "Nonfeedback-based Machine Vision Methods for Determining a Calibration Relationship Between a Camera and a Moveable Object," and U.S. Pat. No. 5,974,169, entitled "Machine Vision Methods for Determining Characteristics of an Object Using Boundary Points and Bounding Regions," disclose examples of such image recognition algorithms. Both of these patents are hereby incorporated by reference in their entirety. Further, well-known image processing techniques can be employed to detect the motion of an object within a field of view. For example, successive image frames can be compared with one another to identify one or more objects, if any, that have moved within the field of view. By way of example, the teachings of U.S. Pat. No. 6,734,911, entitled "Tracking Camera Using a Lens that Generates Both Wide-Angle and Narrow-Angle Views," which is hereby incorporated by reference in its entirety, can be employed to track moving objects within a field of view. As an example, an object tracking algorithm can first determine movement by comparing a sequence of images and estimating the boundaries of the moving object, a process referred to as segmentation in the art. The algorithm can also establish a motion vector for the object using these boundaries. To overcome image noise and improve accuracy in the size and velocity estimates, a Kalman-type filter can be utilized to generate probabilistic predictions for tracking behavior. This type of object tracking algorithm is well-known in the art and is the subject of continuing research and publications.

In response to detecting an object of interest (e.g., an object that has moved within the field of view), the processor can generate one or more control signals that are indicative of the coordinates of the object(s) in the field of view and transmit the control signals to the controller 201, which can, in turn, cause the movement of the movable platform disposed within the image plane 105 to capture further image data of that object. In some implementations, the processor can identify a portion of the image, e.g., a slice of the image, containing the object of interest and can instruct the controller to move the movable platform so as to acquire image data of that slice of the field of view. By way of example, and with reference to FIG. 3B, the processor can identify the slice as the portion of the image confined between the radial lines T and U. The controller can rotate the movable detector back-and-forth between the respective radial lines in the image plane so that the detectors would acquire image data of that slice of the field of view and, consequently, of the object of interest. The processor can then process the image data acquired by the movable image detectors to construct an image of that slice of the field of view and, hence, of the object of interest. The processor can periodically scan the entire field of view through the appropriate combination of movable platform rotations to update the global image. The processor can then effect the presentation of the global and the local images in displays 209 and 210, respectively.

Furthermore, and as noted above, in some implementations the processor 205 can be configured to track one or more objects that are moving within the field of view and to update the control signals indicative of the position of the one or more moving objects within the field of view to cause the movable detectors to continue sampling corresponding portions of the field of view. By way of example, FIGS. 5A and 5B schematically depict a vehicle within a field of view (e.g., a parking lot). In such a case, the processor can scan the global image (e.g., a wide-angle image of the parking lot) to detect the moving vehicle. As noted above, in many embodiments, the processor can utilize appropriate image recognition software to detect the moving vehicle. The processor can then instruct the controller 201 to, for example, rotate the rotatable platform to maintain real-time tracking of the vehicle. As the vehicle moves, a subsequent image acquired by the appropriate image detecting elements, depicted schematically in FIG. 5B, shows the vehicle in a different location. Upon analyzing the global image (constructed from the plurality of image detectors and their image detecting elements), the processor provides updated control signals indicative of the new position of the vehicle to the controller 201 which, in turn, adjusts the rotation of the rotatable platform to maintain the vehicle in view of at least one of the image detectors. This process can be repeated so as to track the moving object as it moves through the field of view. The rotatable detector can also capture images at video rates, i.e., at least 30 frames per second, so as to produce a high resolution video image of the vehicle as it moves in the field of view.

In some implementations of the above tracking application, the processor can periodically generate and analyze a global image corresponding to the entire field of view so as to detect at least one object of interest, if any. For subsequent images, the processor can analyze only the relevant portions (i.e., the portions that contain the object(s) of interest). Alternatively, the processor can analyze the entirety of each image provided by the image detectors so as to generate the requisite control signals for application to the controller 201.

In some embodiments, the imaging system 200 allows tracking multiple moving objects and obtaining high resolution images thereof by employing time multiplexing. For example, for two moving objects, the processor 205 can instruct the image detectors 106, 108 to acquire images or video of those objects in an alternating fashion.

In certain other implementations, the processor can automatically select different portions of the field of view, e.g., randomly or according to a predefined pattern, to be generated as the local image. For each selection, the processor can transmit the appropriate control signals to the controller to cause the movement (e.g., rotation) of the movable image detectors and then pause to obtain a local image of a portion of the field of view that corresponds to that selection. For example, this can be done as the movable detector scans the entire field of view.

While the above-described embodiments focus primarily on the use of the present invention in surveillance and object-tracking applications, systems according to the teachings of the present invention can be utilized in a variety of different imaging applications. By way of example, one such exemplary imaging application is high resolution photography. Imaging systems utilizing the teachings of the present invention can be well suited to creating very high resolution photographs, i.e., photographs having an effective resolution on the order of gigapixels or more.

Figure 6:
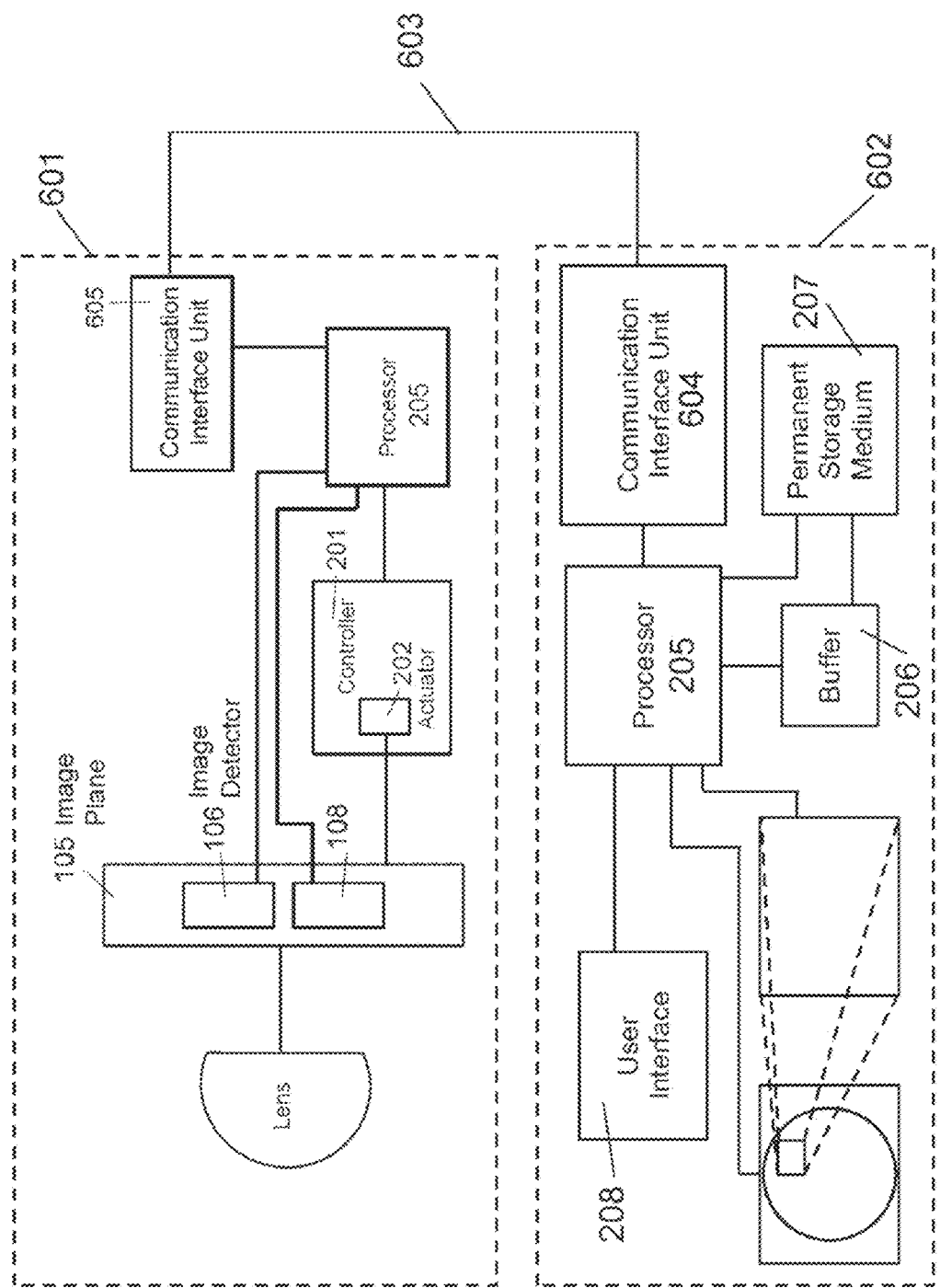
FIG. 6 is a schematic diagram depicting an exemplary embodiment of an imaging system according to the teachings of the present invention in which an optical system is remotely connected to a processing system.

With reference to FIG. 6, in some embodiments, the processor, the display, and the ancillary components can be disposed remotely relative to the controller and the image detectors. For example, the imaging system can include an image capture system 601 and a control/processing system 602 that are remotely located relative to one another and are in communication via a physical or wireless link 603. In this exemplary implementation, the image capture system includes the image detectors 106, 108 and controller 201. The control/processing system 602 includes the processor 205, the buffer 206, the storage unit 207, the user interface 208, and other well-known ancillary components (e.g., random access memory, etc), that are not shown for ease of illustration. A communication interface unit 604 of the control/processing system 602 can communicate with a respective communication interface unit 605 of the image capture unit 601, e.g., by employing a variety of known protocols to transmit control signals from the processor to the controller and/or receive the image data acquired by the image detectors 106, 108.

Figure 7:
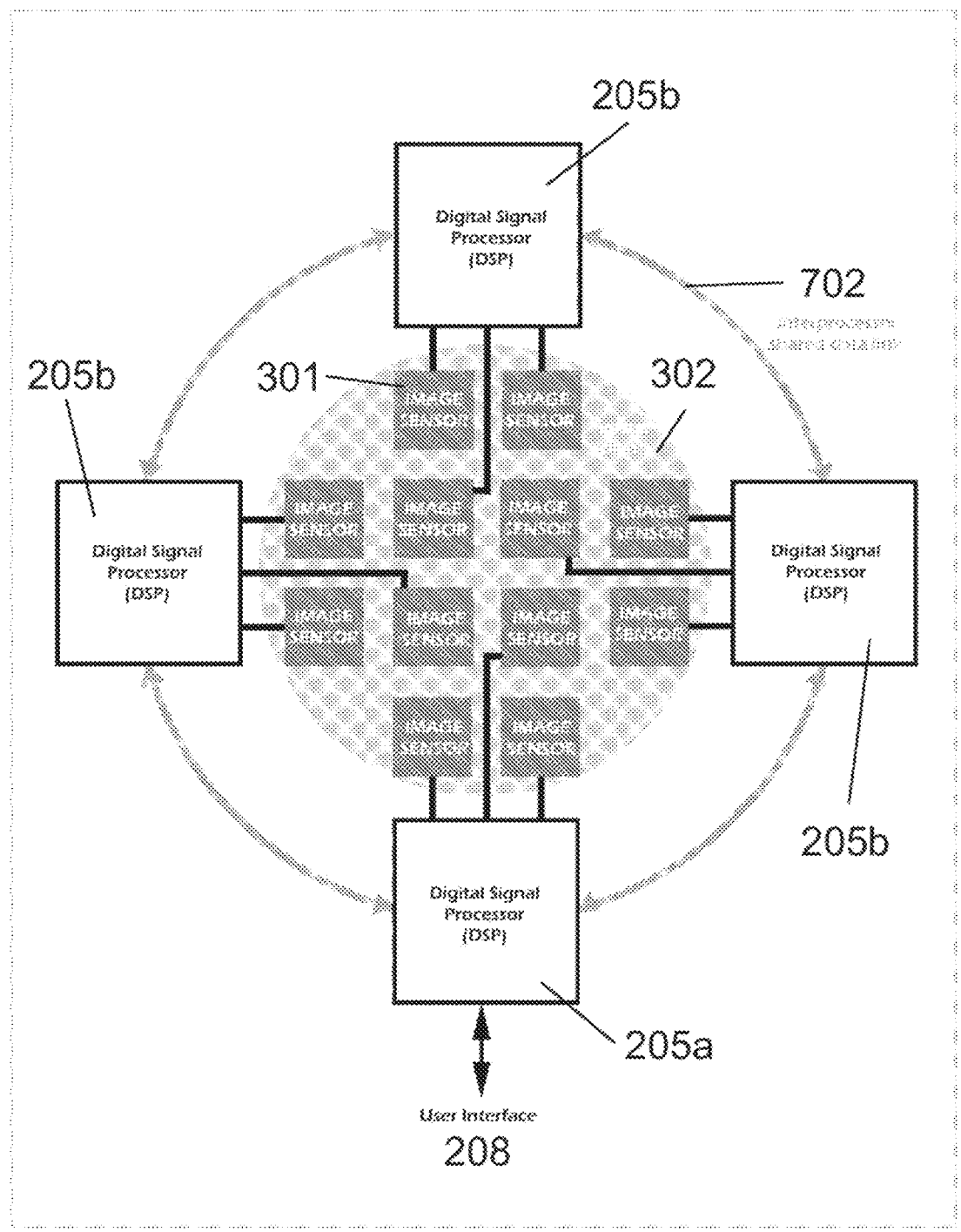
FIG. 7 is a schematic view of an exemplary embodiment of a imaging system utilizing multiple processors.

As shown in FIG. 7, certain embodiments can make use of more than one processor 205 to control the image detectors and acquire the image data. In the embodiment shown in FIG. 7, four processors 205 are used to control the image detecting elements disposed on a rotatable platform 302 within the image plane. The various processors can be networked together using an inter-processor shared data link 702. When multiple processors are present, different workload sharing schemes can be used. For example, one processor 205a can be designated as a master processor while the remaining processors 205b are configured to be slave processors. In such an arrangement, the master processor 205a can be responsible for controlling the movement of the platform containing the image detecting elements, and also for assembling the global and local images from the image data gathered by the remaining processors 205b. This, however, is not the only possibility for dividing the processing duties when more than one processor 205 is present.

In other embodiments, the image plane is configured to utilize translation rather than rotation to sample different areas in the field of view. By way of example, translation of the movable image detector can be accomplished by mounting one or more image detection units on a platform capable of 2-axis motion in the image plane. FIG. 7 illustrates an exemplary image plane 801 and image detection unit 802 capable of 2-axis translation within the plane. Similar to the rotational platform described with reference to FIG. 4, a translating platform can be connected to a controller, an actuator, and a processor in order to receive directional commands and transmit captured image data.

Figure 8:
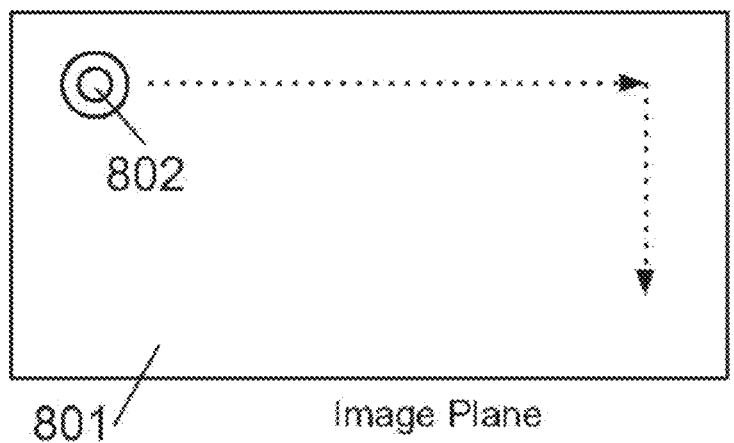
FIG. 8 is a schematic front view of an exemplary embodiment of a movable image detector suitable for use in the practice of the invention in which image detecting elements translate in two dimensions.
Figure 9:
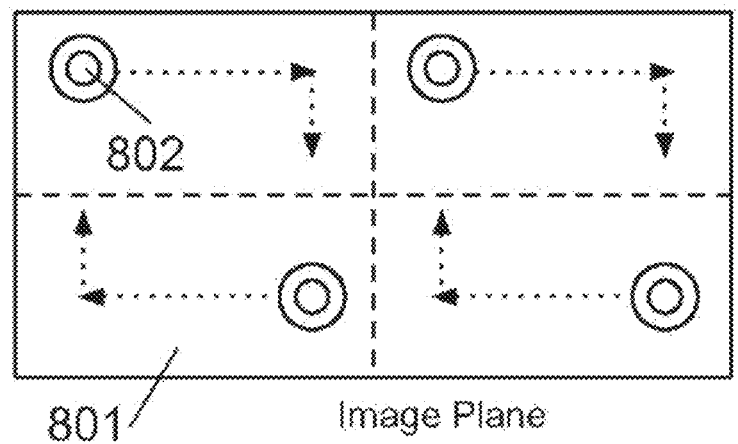
FIG. 9 is a schematic front view of an exemplary embodiment of a movable image detector suitable for use in the practice of the invention in which multiple sets of image detecting elements translate in two dimensions.

FIG. 8 illustrates a variation of the translating platform in which multiple platforms are disposed in the image plane. In such a configuration, each platform having one or more image detecting elements 802 is capable of translating across a portion of the image plane 801. Similar to the rotational configuration described with respect to FIG. 3C, dividing the image plane into sections can allow more rapid imaging and even simultaneous imaging of two or more portions of the image plane.

Figure 10:
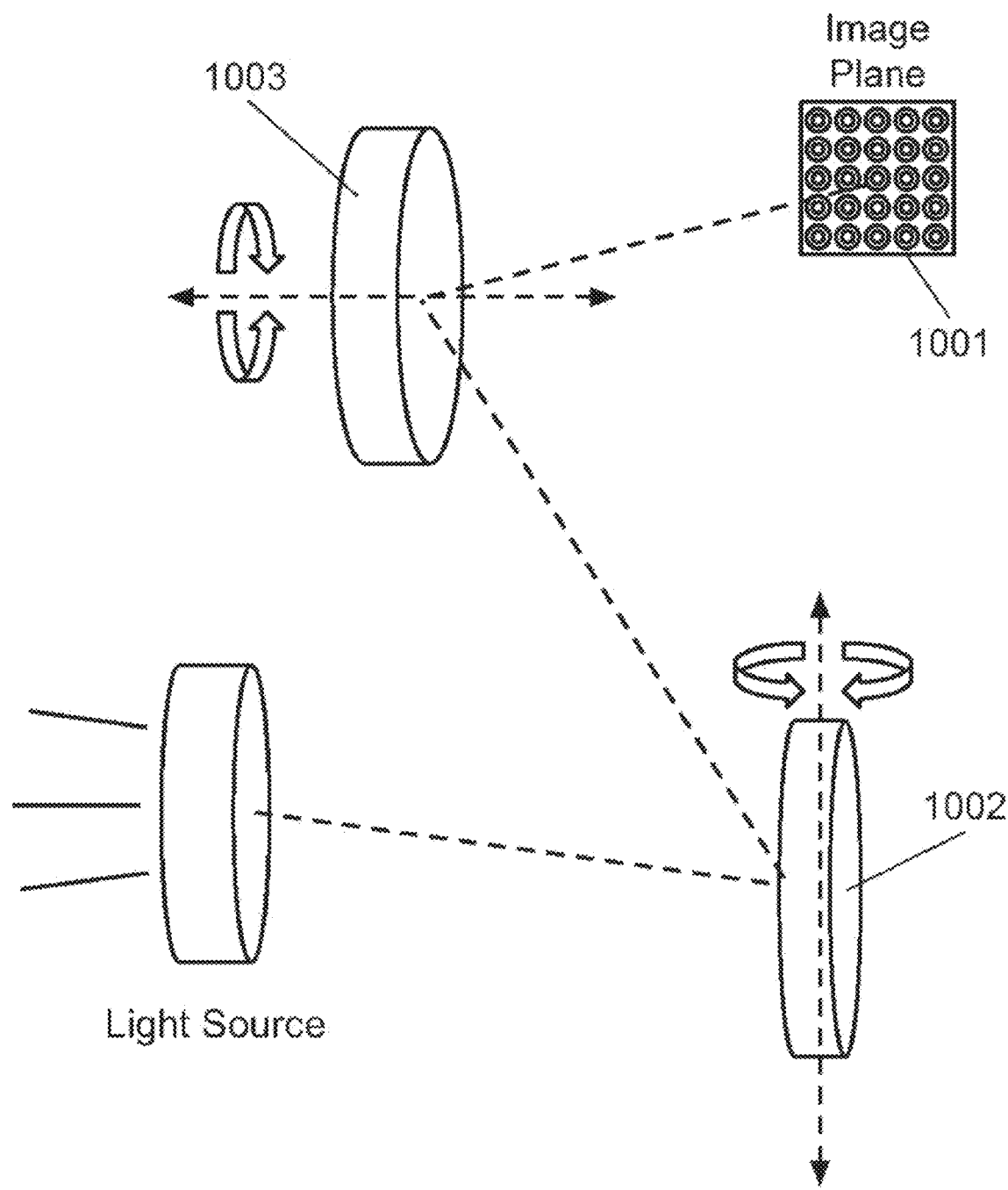
FIG. 10 depicts schematically an exemplary embodiment of an imaging system according to the teachings of the present invention in which movable mirrors rather than movable image detectors are used to allow imaging of different portions of a field of view.

In still other embodiments, rather than employing a movable image detector to acquire image data for generating image data, the image detector can be fixedly coupled to the image plane and an optical system can be employed to scan the light received from the field of view, or at least a portion thereof, over the image detector. By way of example, FIG. 10 shows an exemplary implementation of such a system in which an image detector 1001 comprises a plurality of image detecting elements, such as those discussed above, that are disposed in a fixed array. A first rotatable mirror 1002 is configured to scan received light in a direction normal to its axis of rotation. A second, rotatable mirror 1003 has an axis of rotation that is orthogonal to the axis of rotation of the first mirror 1002. As a result, the light received from different portions of the field of view can be scanned over the image detector 1001 using a combination of rotation of the first and second rotatable mirrors 1002, 1003.

In such embodiments, a controller 201 and actuator 202 can be configured to precisely control the angle of rotation for rotatable mirrors 1002 and 1003. Controller 201 can also be configured to relay information related to the positioning of the rotatable mirrors to processor 205 so that processor 205 can correlate each data acquisition by the image detector 1001 with a specific segment of the field of view. Using the acquired image data and location information, processor 205 can construct a high resolution image of a portion of the field of view.

In yet other embodiments, an image detector 1001 can be used that has a plurality of image detecting elements spanning one linear dimension (e.g., the y-dimension) of the image plane. In such a configuration, a single rotatable mirror 1002 can be employed to scan the light received from different portions of the field of view over the detector 1001 along an orthogonal direction (e.g., the x-direction) of the image plane so as to generate an image of a selected portion of the field of view. In such a configuration, the resolution of the image can be increased in the direction of scanning (e.g., the x-direction).

Figure 11:
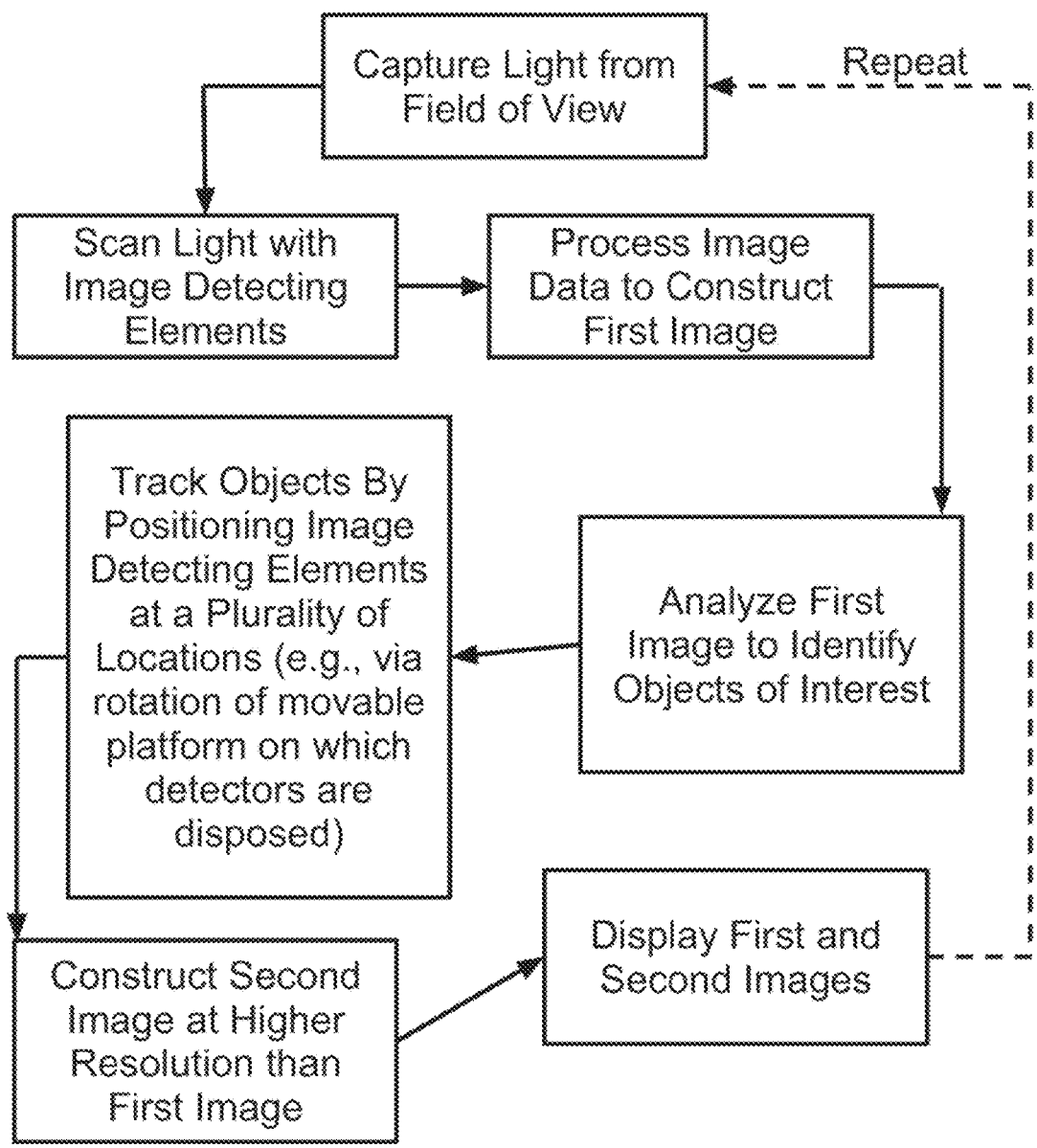
FIG. 11 is a flow diagram depicting various steps of an exemplary embodiment of a method of the present invention.

In other aspects, the present invention provides imaging methods. By way of example, FIG. 11 illustrates a flow chart depicting various steps in an embodiment of a method according to the teachings of the present invention for imaging a field of view. First, light is captured from a field of view and directed to the image plane. The image plane is scanned, for example, using a pattern of rotations or displacements of one or more image detectors. The image data collected during the scan can be used to create a global image, for example, by a processor in communication with the image detectors. In some embodiments, this image data can be analyzed to determine changes in the field of view (e.g., movement of objects of interest) and control signals can be sent to the movable image detectors to detect light emanating from one or more portions of the field of view. Control signals can then be sent to cause the image detectors to capture image data from a plurality of points in the image plane that correspond to one or more portions of the field of view (e.g., one or more selected portions containing the one or more objects of interest). This process can be repeated (e.g., at very high rates) to allow, for example, continuous tracking of objects of interest while maintaining the global image.

One skilled in the art will appreciate further features and advantages of the invention based on the above-described embodiments. Accordingly, the invention is not to be limited by what has been particularly shown and described, except as indicated by the appended claims.

What is claimed is:

1. An imaging system, comprising:
   an optical system configured to collect light from a field of view and direct the collected light to an image plane;
   a rotatable platform, disposed within the image plane, to receive at least a portion of said collected light directed to said image plane,
   a plurality of image detecting elements disposed on the platform,
      wherein the plurality of image detecting elements is non-uniformly distributed over the platform, such that the distribution comprises a plurality of image detecting clusters or tiles, each of which has a density of image detecting elements greater than an average density of the image detecting elements over the platform,
      wherein the disposition of the plurality of image detecting elements is such that one or more of the elements are separated from one or more other elements by an area of the platform in which no image detecting elements are present,
      wherein said plurality of image detecting elements detect different portions of the light received by the rotatable platform as the platform rotates and generate image data corresponding to at least one portion of the field of view,
   a processor, in communication with the plurality of image detecting elements,
   wherein the processor is configured to:
      receive the generated image data;
      operate on the image data acquired by the plurality of image detecting elements in m number of the clusters to generate a global image from the image data representing at least a portion of the field of view and analyze the global image to identify any objects of interest in the field of view;
      effect rotation of the rotatable platform about an axis of the image plane;
      rotate the plurality of image detecting elements within the image plane; and
      gather local image data corresponding to a portion of the field of view in the global image that contains the one or more objects of interest; and
      operate on the image data acquired by a plurality of image detecting elements in n number of the clusters to generate the local image from the local image data representing at least a portion of the field of view depicted in the global image,
      wherein n is greater than m,
      wherein the global image created from the image data has a first resolution and the local image created form the local image data has a second resolution that is greater than the first resolution.

2. The imaging system of claim 1, further comprising an actuator in communication with the rotatable platform and the processor, said actuator effecting rotation of the platform in response to instructions from the processor.

3. The imaging system of claim 1, wherein said image data acquired by the image detecting elements comprises a plurality of image pixels and the processor operates on a fraction of said pixels to generate said global image.

4. The imaging system of claim 3, wherein said fraction of the pixels comprises any of about ½, about ¼, about ⅕, about 1/10, about 1/100, about 1/200, about 1/1000, or about 1/10,000 of the image pixels.

5. An imaging method, comprising:
   providing a plurality of image detecting elements disposed on a rotatable platform within an image plane,
      wherein the plurality of image detecting elements is non-uniformly distributed over the platform, such that the distribution comprises a plurality of image detecting clusters or tiles, each of which has a density of image detecting elements greater than an average density of the image detecting elements over the platform, and
      wherein the disposition of the plurality of image detecting elements is such that one or more of said image detecting elements are separated from one or more other image detecting elements by an area of the platform in which no image detecting elements are present;
   causing rotation of said rotatable platform,
   capturing light emanating from a field of view and directing the captured light to the plurality of image detecting elements as the platform rotates such that said image detecting elements detect different portions of the light received by the rotatable platform so as to generate image data corresponding to at least one portion of the field of view, generating first image data using the plurality of image detecting elements on the rotatable platform;

operating on the first image data acquired by the plurality of image detecting elements in m number of the clusters to generate a global image of the field of view at a lower resolution;

analyzing the first image data to identify one or more objects of interest in the field of view, if any;

rotating the platform, about an axis of the image plane, and, thereby, rotating the plurality of the image detecting elements;

generating second image data, corresponding to at least a portion of the field of view in which the identified one or more objects of interests are contained, using the rotated plurality of image detecting elements; and operating on said second image data acquired by a plurality of image detecting elements in n number of the clusters to generate a local image, of the at least a portion of the field of view containing the one or more objects of interest identified using the global image, at a second resolution;

wherein n is greater than m, and wherein the resolution of the local image is greater than the resolution of the global image.

6. The method of claim 5, wherein the first and second image data comprises a plurality of image pixels.

7. The method of claim 6, wherein said first image data comprises a plurality of image pixels suitable for generating an image of the entire field of view.

8. The imaging system of claim 1,
wherein the processor is configured to:
gather local image data corresponding to one or more objects of interest that are moving in the field of view; and
operate on the image data acquired by a plurality of image detecting elements of the clusters to generate a local image from the local image data representing at least a portion of the field of view having the one or more moving objects,
wherein the processor is further configured to
repeat the gathering of local image data and the operating on the image data such that the system tracks the one or more moving objects within the field of view.

9. The optical tracking imaging system of claim 5, wherein said processor is configured to control different portions of said image detecting elements to acquire image data of said object of interest as the platform continues to rotate.

10. The optical tracking imaging system of claim 5, wherein said rotation of the platform results in one or more of the image detecting elements detecting light from one or more portions of the field of view that is incident on one or more detector-free zones when the platform is stationary.

11. The imaging system of claim 1, wherein the processor is configured to effect continuous rotation of the rotatable platform as the image data is gathered.

* * * * *